Feb. 5, 1963  D. M. NELSON  3,076,384
ADJUSTABLE REAR VIEW MIRROR
Filed June 22, 1959  2 Sheets-Sheet 1
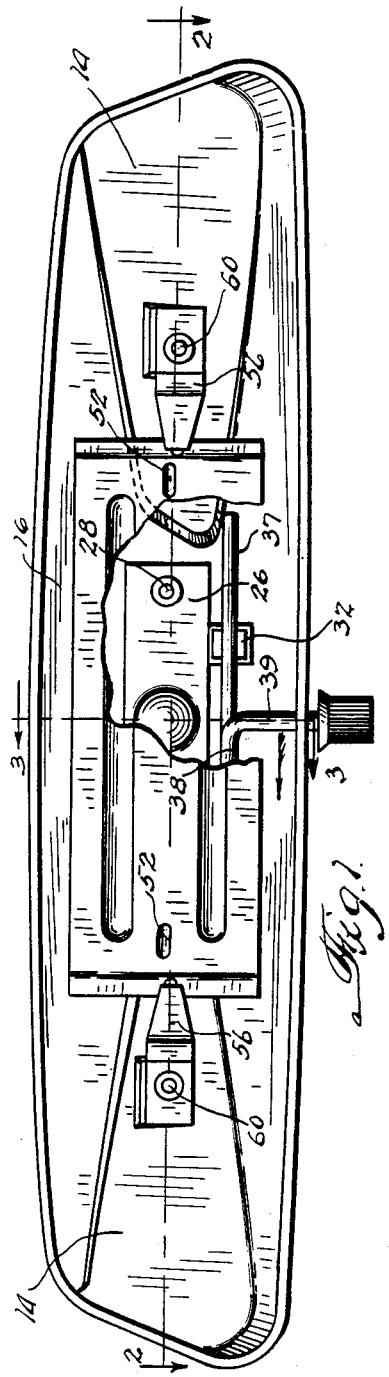
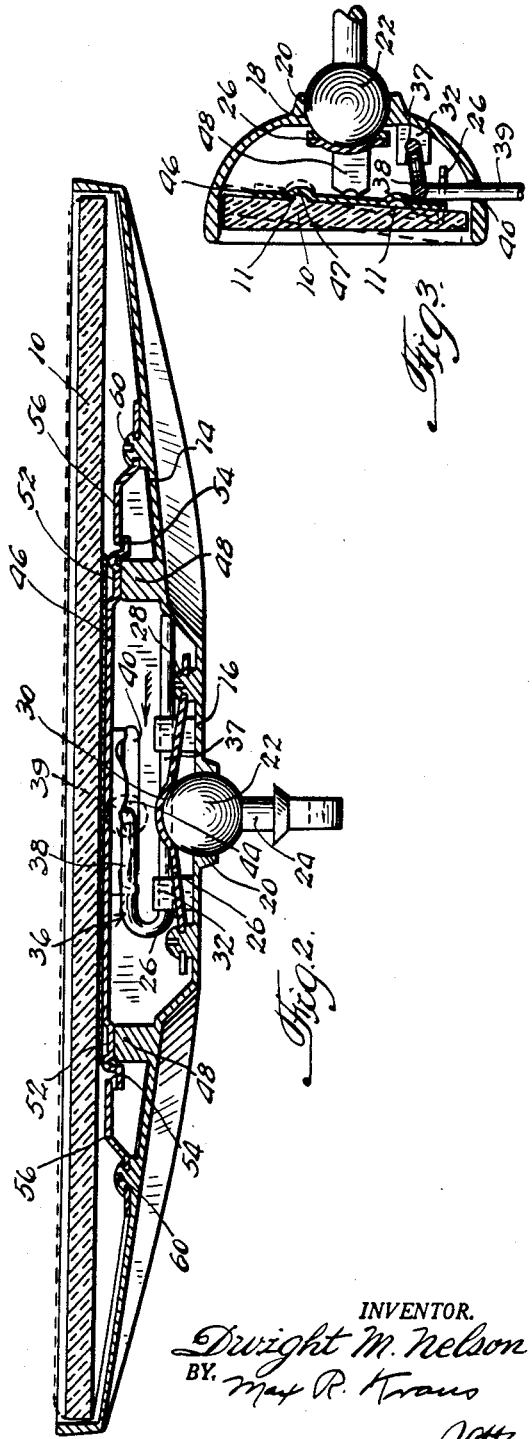
INVENTOR.
Dwight M. Nelson
BY Max R. Kraus Feb. 5, 1963   D. M. NELSON   3,076,384
ADJUSTABLE REAR VIEW MIRROR
Filed June 22, 1959   2 Sheets-Sheet 2
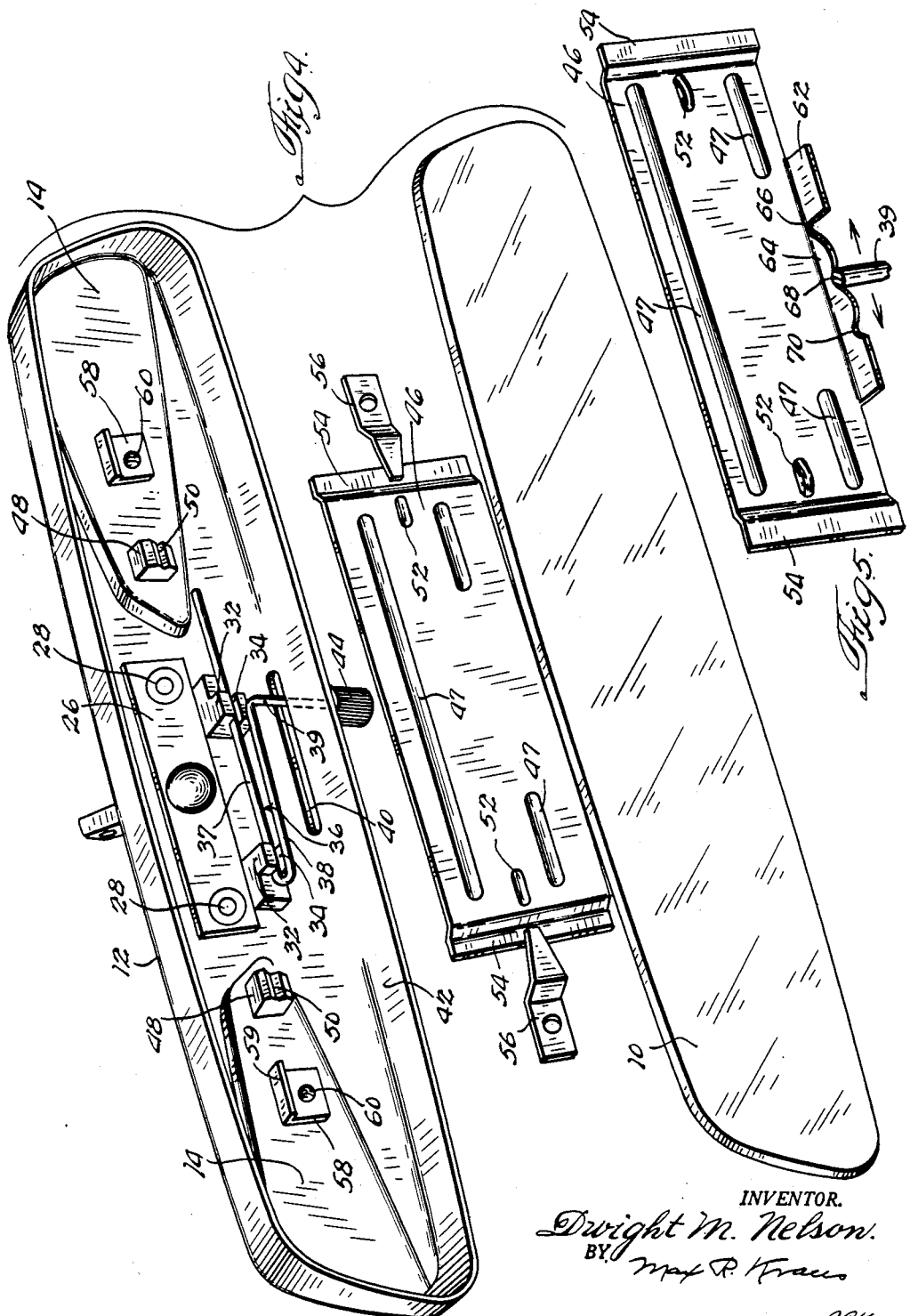
INVENTOR.
Dwight M. Nelson
BY Max R. Kraus
ATTY.

United States Patent Office 3,076,384
Patented Feb. 5, 1963

3,076,384
ADJUSTABLE REAR VIEW MIRROR
Dwight M. Nelson, 19550 Harper Ave.,
Grosse Pointe, Mich.
Filed June 22, 1959, Ser. No. 822,039
2 Claims. (Cl. 88—77)

This invention relates to an adjustable rear view mirror.

One of the objects of this invention is to provide a glare reducing rear vision mirror adapted for both night and day driving in which the adjustment or the flip action of the mirror is effected by a sliding movement of the operating handle.

Another object of this invention is to provide a rear vision mirror which can be quickly and positively adjusted to any one of three positions, whereby either a high intensity image, a lower intensity image and a still lower intensity image is reflected to the driver, this being readily effected by the mere sliding action of an operating handle without the necessity of carefully adjusting the mirror to the relatively critical angles required for reflection of an image of any particular intensity and without diverting the attention of the driver to any substantial degree.

Another object of this invention is to provide a mounting for such a rear vision mirror which is free from vibration and free from the loss of proper positioning due to automobile vibration.

Another object of this invention is to provide either a two or a three position rear view mirror merely by using a two or a three position cam surface on the mirror supporting plate. The remainder of the mirror construction remains the same.

Another object of this invention is to provide a rear vision mirror which may be assembled without a screw, bolt or fastener, the die cast housing or casing being so constructed as to provide studs which are peened, spun or staked to retain the desired part.

Another object of this invention is to provide a rear vision mirror in which the mirror is supported on a plate which is pivotally mounted in a housing or casing. The pivoted action of the mirror is divorced from the swivel mounting of the housing, thus during the flip action of the mirror the mirror housing remains unmoved and the operating handle for pivoting or flipping the mirror is moved in one direction only. Since the swivel mounting of the housing is not used as a leverage point, a low tension spring may be used.

Other objects will become apparent as this description progresses.

In the drawings:

FIGURE 1 is a front elevation view of the unit with the mirror or reflector removed.

FIGURE 2 is a sectional view taken on lines 2—2 of FIGURE 1 but with the mirror in position.

FIGURE 3 is a cross-sectional view taken on lines 3—3 of FIGURE 2.

FIGURE 4 is an exploded view of the parts and

FIGURE 5 is a rear perspective view of the mirror supporting plate.

The invention is shown in connection with a prismoidal mirror or reflector which is generally indicated at 10. The prismoidal mirror which is well known in the art is made of a generally rectangular plate of glass with flat front and rear surfaces disposed vertically at such an angle to each other as to separate the images from the front and rear surfaces sufficiently that at the distance of the driver's eyes from the mirror only one of them at a time is perceptible. The mirror or reflector is thereby wedge shaped in vertical section and is arranged with its thicker part at the upper end. The glass plate is provided on its rear face with a coating of reflective material such as silver.

The mirror 10 is rigidly secured to a mirror supporting plate which will be subsequently described, which plate is pivotally or tiltably movable with respect to the supporting casing or housing to change the angle of the reflective mirror. The supporting casing or housing generally indicated at 12 is preferably die cast and is formed with studs which are peened, spun or staked to provide the fastening means. The rear wall of the housing is offset forwardly at its opposite sides to form spaced generally flat surfaces 14 which extend inwardly of the central rearwardly extending portion 16 of the rear wall.

The central portion 16 of the rear wall is provided with a central opening 18 and the metal surrounding the opening is shaped to provide a socket 20 to receive the ball 22 which in turn is secured to an arm 24 which is attached to the vehicle as is well understood.

A strip of spring steel 26 is suitably secured as by studs 28 formed in the inside of the central portion 16 of the rear wall of the housing 12. The studs 28 pass through suitable openings in the strip 26 and are peened over. The strip 26 extends across the front of the ball 22 and is provided with a part-spherical seat 30 which engages the ball 22 and frictionally clamps the ball between the strip 26 and the socket 20 and retains the ball in the socket in a frictional tight fit. The casing or housing 12 may however be manually adjusted or swiveled by moving the casing for alinement and the like, as is well understood, however, pivoting of the reflective mirror 10, as will be subsequently explained, is independent and divorced from the swiveling of the housing. The pivoting of the mirror 10 will not effect the adjusted position of the housing 12 with respect to the ball 22 and socket 20 as the frictional engagement of the ball in the socket of the housing is greater than any pressure that might be exerted in manually sliding the slide member for changing the angle of the reflective mirror 10.

Formed integrally with the central portion of the rear wall of the housing 10 and extending into the interior of the housing are a pair of spaced bosses 32 each having a horizontally extending recess 34 to slidingly receive a sliding member generally indicated at 36 which consists of a wire member having a longitudinal rear portion 37 and a forwardly continuing portion 38 extending parallel to the longitudinal portion 37 and on the same plane and a downwardly extending vertical stem 39 which extends through a longitudinal slot 40 formed in the lower forwardly extending flange 42 of the housing 12. A knob 44 is secured to the end of the stem for manual engagement and for the purpose of sliding the slideable actuator 36. The slot 40 limits the sliding movement of the slideable member 36 in either direction and also retains same in the recesses 34.

The slideable member 36 is adapted to engage the mirror supporting plate generally indicated at 46 on which the reflective mirror 10 is secured for the purpose of pivoting or tilting said plate 46 and changing the position of the reflective mirror 10.

A pair of spaced bosses 48 are formed on the opposite flat surfaces of the rear wall of the housing 12 and each of said bosses has a semi-circular recess 50 to receive the bearing portions of the mirror supporting plate 46. The plate 46, made preferably of metal is provided with a pair of spaced indented surfaces 52 generally semi-circular in section which are received in the recesses 50 of the bosses 48 and which serve as bearings for the pivotal movement of the plate 46. The opposite ends of the plate 46 are offset rearwardly as at 54 and are engaged by spring fingers 56 which serve to retain the plate 46 in position.

The flat rear wall surfaces 14 of the housing are provided with another pair of spaced bosses 58 formed thereon, generally of inverted L-shape. Studs 60 are formed in the housing 12 which pass through a suitable opening in the finger 56, which studs are peened to secure the fingers 56 to the housing 12.

The fingers 56 are offset forwardly to engage the offset ends 54 of the plate 46. The lip 59 of the boss 58 prevents lateral displacement of the spring finger 56. The spring fingers 56 will hold the mirror supporting plate 46 in position so that the indented surfaces 52 of the plate are confined in the recesses 50 of the bosses 58. However, the plate 46 is pivotable or tiltable with respect to the housing 12. The fingers 56 not only hold down the plate 46, they also act to pivot the plate, thus combining two functions in the spring fingers 56.

The plate 46 has a lower rearwardly extending flange 62 at right angles to the plane of the plate. The flange 62 is shaped as best shown in FIGURE 5, and is provided with a continuous cammed surface 64 having three stopping points designated by the numerals 66, 68, and 70. The stopping point 66 is closest to the vertical wall of the plate 46. Stopping point 68 is intermediate and stopping point 70 is the furthest away from the wall of the plate. As here shown the mirror is adjustable to three positions. However, if desired a mirror adjustable to two positions may be provided by having the flange 62 provided with two stopping points instead of three as shown. No other changes are necessary.

The prismatic mirror 10 is suitably secured to the mirror supporting plate 46 in any well-known manner as to be fixedly secured to the plate 46 to move with said plate. To effect a positive securement the rear of the mirror 10 is provided with longitudinal ribs 11 which seat in longitudinal recesses 47 formed in the plate 46.

*Operation*

The adjustment of the rear vision mirror is extremely simple. The mirror housing 12 is first adjusted to aline the mirror as a whole to reflect the view from the rear view of the automobile and this is effected by swiveling and properly alining the housing through the ball 22 and socket 20 connection. When thus alined it may be adjusted for different intensities of light by merely sliding the slide selector member 36 so that the stem portion 39 engages the cammed surfaces 64 which will cause the mirror supporting plate 46 and mirror 10 fixed thereon to pivot or tilt with respect to the housing 12 inside said housing. With the stem 39 of the slide selector engaging the first recess 66, the plate 46 and mirror 10 are substantially parallel with the rear wall of the housing 12. Sliding the selector so that it engages the intermediate recess 68 will pivot the plate and mirror at a slight angle with respect to the housing and sliding the selector to the third position 70 will pivot the plate and mirror to a greater angle than the intermediate position. The pivoting of the plate 46 is about the longitudinal axis defined by the recesses 50 and indented surfaces 52 as the bearing points. While the plate and mirror are thus pivoted, as described in relation to the housing, the housing remains in its fixed position. The plate 46 will be held in any of its pivoted positions by virtue of the spring fingers 56. Changing of the pivoted position of the plate 46 can be effected only through the sliding of the slide selector 36.

It will be understood that various changes and modifications may be made without departing from the spirit and scope of the appended claims.

I claim:

1. An adjustable mounting for supporting from a stem having a ball at the free end thereof, a multi-position, glare reducing rear view mirror assembly having a casing, pressure means secured to said casing and engaging the ball for frictionally retaining the casing in adjusted position, a mirror supporting plate secured within said casing for pivotal movement with respect to said casing on a fulcrum positioned between the top and bottom of said mirror supporting plate, substantially centrally of the longitudinal axis of the mirror, a reflective mirror fixedly secured to the front of said plate to move with said plate, said reflective mirror having a size and shape substantially the entire front of said casing, said plate having a cammed surface with portions providing for the multi-positioning of the mirror, an elongated U-shaped slidable member supported on said casing inside said casing and having one leg thereof slidable longitudinally on a longitudinal axis with respect to said casing and the other leg thereof having a portion engaging said cammed surface for simultaneously pivoting said plate and said reflective mirror with respect to said casing without affecting the adjusted position of said casing, said pressure means applying a greater pressure against said ball than the manual pressure needed to slide said slidable member, said pressure means engagement with said ball being independent of and divorced from the pivoting of said mirror supporting plate so that the pivoting of said mirror supporting plate does not affect the adjusted position of said casing.

2. An adjustable mounting for supporting from a stem having a ball at the free end thereof, a multi-position, glare reducing rear view mirror assembly having a casing, pressure means secured to said casing and engaging the ball for frictionally retaining the casing in adjusted position, a mirror supporting plate secured in said casing for tilting movement with respect to said casing on a fulcrum positioned between the top and bottom of said mirror supporting plate, substantially centrally of the longitudinal axis of the mirror, a reflective mirror fixedly secured to said plate to tilt with said plate, said reflective mirror having a size and shape substantially that of the front of the casing and positioned to span substantially the entire front of said casing, said plate having a cammed surface provided with a plurality of definite stop positions to provide multi-positioning of the mirror, an elongated U-shaped slidable member supported on said casing and within said casing and having one leg thereof slidable longitudinally on a longitudinal axis with respect to said casing and the other leg thereof having a portion engaging said cammed surface for simultaneously tilting said plate and said reflective mirror with respect to said casing without affecting the adjusted position of said casing, said slidable member when engaging said definite stop positions adapted to maintain said plate and reflective mirror in any one of several adjusted positions, said pressure means applying a greater pressure against said ball than the manual pressure needed to slide said slidable member, said pressure means engagement with said ball being independent of and divorced from the pivoting of said mirror supporting member so that the pivoting of said mirror supporting member does not affect the adjusted position of said casing.

References Cited in the file of this patent

UNITED STATES PATENTS

| | | |
|---|---|---|
| 2,052,770 | Hofer | Sept. 1, 1936 |
| 2,469,207 | Roedding | May 3, 1949 |

FOREIGN PATENTS

| | | |
|---|---|---|
| 757,974 | Great Britain | Sept. 26, 1956 |